United States Patent
Toksvig et al.

(10) Patent No.: US 7,385,611 B1
(45) Date of Patent: Jun. 10, 2008

(54) DECOMPRESSION OF BLOCK ENCODED TEXTURE DATA

(75) Inventors: Michael J. M. Toksvig, Palo Alto, CA (US); Apoorv Gupta, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/295,774

(22) Filed: Dec. 7, 2005

(51) Int. Cl.
  *G09G 5/00* (2006.01)
  *G06K 9/00* (2006.01)

(52) U.S. Cl. ...................................... 345/582; 382/166

(58) Field of Classification Search ................ 345/582; 382/232–253, 166, 233
See application file for complete search history.

(56) References Cited

U.S. PATENT DOCUMENTS

| | | | | |
|---|---|---|---|---|
| 5,374,957 A | * | 12/1994 | Sharma | ................... 348/391.1 |
| 5,956,431 A | * | 9/1999 | Iourcha et al. | .............. 382/253 |
| 6,069,635 A | * | 5/2000 | Suzuoki et al. | ............. 345/582 |
| 6,636,644 B1 | * | 10/2003 | Itokawa | ...................... 382/243 |
| 6,819,793 B1 | * | 11/2004 | Reshetov et al. | ........... 382/166 |
| 6,959,110 B1 | * | 10/2005 | Danskin et al. | ............. 382/166 |

* cited by examiner

*Primary Examiner*—Xiao Wu
*Assistant Examiner*—Joseph Barnes
(74) *Attorney, Agent, or Firm*—Patterson & Sheridan, LLP

(57) ABSTRACT

Systems and methods that decompress block compressed texture data may decompress the texture data while simplifying computations to reduce die area while maintaining the required accuracy. Reducing the die area permits more texture data to be decompressed in the same die area compared with a more accurate decompression, thereby increasing texture decompression throughput. Computations are simplified by combining denominators for linear interpolation with format conversion to decompress texture data components compressed using conventional block compression formats.

15 Claims, 8 Drawing Sheets

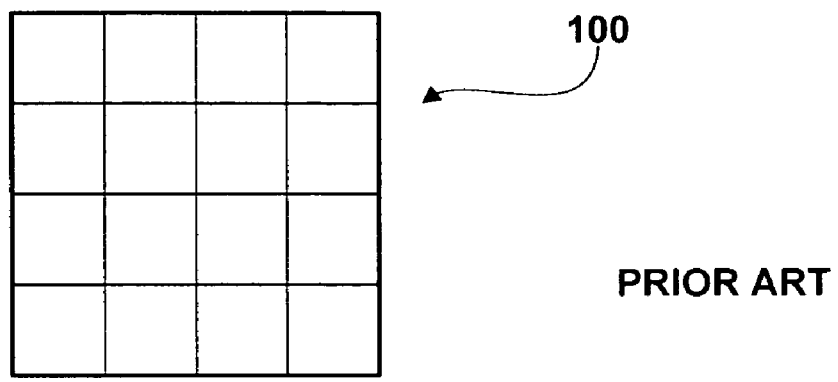

Figure 1A

PRIOR ART

```
           Bits
    7 6 5 4 3 2 1 0
   ┌───────────────────┐
   │  Color0 bits 7:0  │ Byte 0
   ├───────────────────┤
   │  Color0 bits 15:8 │ Byte 1
   ├───────────────────┤
   │  Color1 bits 7:0  │ Byte 2
   ├───────────────────┤
   │  Color1 bits 15:8 │ Byte 3
   ├────┬────┬────┬────┤
   │ i03│ i02│ i01│ i00│ Byte 4
   ├────┼────┼────┼────┤
   │ i13│ i12│ i11│ i10│ Byte 5
   ├────┼────┼────┼────┤
   │ i23│ i22│ i21│ i20│ Byte 6
   ├────┼────┼────┼────┤
   │ i33│ i32│ i31│ i30│ Byte 7
   └────┴────┴────┴────┘
```

PRIOR ART

Figure 1B

DECOMPRESSION OF BLOCK ENCODED TEXTURE DATA

BACKGROUND OF THE INVENTION

1. Field of the Invention

Embodiments of the present invention generally relate to decompression of texture data that is compressed using a fixed block compression technique and, more specifically, to decompression of a 4×4 block of texture data compressed into a conventional block compression format.

2. Description of the Related Art

Conventional compression techniques and formats, such as a DXTC compressed texture format used by Microsoft's DirectX API, e.g., DXT1, DXT2, DXT3, DXT4, DXT5, BC4, and BC5, may be used to compress unsigned or signed data for a 4×4 block of texture data including 3 components represented by a 16 bit value, such as 565 format RGB (red, green, blue) data. Some block compression formats also include alpha, for example storing 16 4 bit alpha values or 2 8 bit alpha values and 16 3 bit indices (one index for each texel) along with the compressed color components for a 4×4 block.

FIG. 1A illustrates a prior art fixed size, 4×4, block 100 of 16 texels that is compressed using a conventional block compression technique. Each texel within block 100 may include one or more components, e.g., red, green, blue, alpha, or the like. Each component is compressed separately to reduce any cross-component interactions. Blocks of texture data, e.g., color or alpha, within a texture map may be compressed to a specific DXTC format.

FIG. 1B illustrates prior art data fields of a conventional DXTC compression format representing a block 100. A single component of 16 bit texel data for block 100 is 256 bits in size. The compression ratios for DXTC compressed texture data range from 4:1 to 8:1, depending on the format used. The DXTC compression formats include 64 bits of data (8 bytes) representing a compressed component of block 100. Some of the compression formats include two 16 bit values, Color0 and Color1, and 16 2 bit indices, one index for each texel. Each index is referenced as iyx, where x and y correspond to the x,y position of the texel within block 100. For example, index i01 corresponds to y=0 and x=1. Color0 and color1 may each represent a 16 bit value, such as 565 RGB data and each index corresponds to one texel in block 100, and specify how combine color0 and color1 to produce the texture data corresponding to each texel in block 100.

Because DXTC compression is lossy, a certain amount of error is tolerated, and the maximum tolerable error is specified by the standard. Decompressing the texture data with a minimum error may require complex computations that are not well-suited to a hardware implementation.

Accordingly, there is a need for decompression of texture data that simplifies the computations needed to produce the decompressed texture data while remaining within the error tolerance specified by the decompression standard. Simplifying the computations allows for the texture data decompression throughput to be increased when compared with decompressing using more accuracy and more complex computations. Furthermore, it is desirable to decompress multiple DXTC compressed texture formats using a multi-purpose decompression unit to produce the texture data given a variety of formats rather than using dedicated decompression units that are specific to each DXTC format.

SUMMARY OF THE INVENTION

The current invention involves new systems and methods for decompressing block compressed texture data may decompress the texture data while simplifying computations to reduce die area while maintaining the required accuracy. Reducing the die area permits more texture data to be decompressed in the same die area compared with a more accurate decompression, thereby increasing texture decompression throughput. The computations used to decompress the texture data are simplified by combining denominators used for division in linear interpolation with format conversion to decompress texture data components compressed into conventional block compression formats.

Various embodiments of the invention include a system for decompressing texture data encoded in a block compression format including an extraction unit and a computation unit. The extraction unit is configured to extract a first texel component value, a second texel component value, and indices from the compressed format. The computation unit is configured to compute a numerator for a texel component based on one of the indices, the first texel component value, and the second texel component value and scale the numerator by a conversion factor to produce the texture data, wherein the conversion factor is selected from a fixed set of conversion factors based on the block compression format, the texel component, and a comparison of the first texel component value and the second texel component value.

Various embodiments of a method of the invention for decompressing texture data encoded in a block compression format including computing a numerator for a texel component based on an index, a first texel component value, and a second texel component value, selecting a conversion factor from a fixed set of conversion factors based on the block compression format, the texel component, and a comparison of the first value and the second value, and scaling the numerator by the conversion factor to produce a scaled numerator and the texture data.

Various embodiments of a method of the invention for computing an interpolated value given two endpoints and a block compression format index including computing a difference between the two endpoints, selecting one of the endpoints as a base endpoint based on the block compression format index, determining a power of two index based on the block compression format index and the difference between the two endpoints, and computing the interpolated value by combining the base endpoint with the difference between the two endpoints scaled by the power of two index.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1A illustrates a prior art fixed size block of texels that is compressed using a conventional block compression technique.

FIG. 1B illustrates prior art data fields of a conventional DXTC compression format representing a block.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Bit specific algorithms are not specified for use in decompressing texture data that is compressed into DXTC formats. Instead, implementers have the flexibility to design a decompression method that produces texture data within an error tolerance specified by the format. In particular, computations may be simplified to reduce die area while maintaining the required accuracy. Reducing the die area permits more texture data to be decompressed in the same die area compared with a more accurate decompression, thereby increasing texture decompression throughput. Alternatively, the same texture data decompression throughput may be maintained using less die area. Computations are simplified by combining denominators for linear interpolation with format conversion to decompress texture data components compressed using conventional block compression formats, such as DXTC formats specified by Microsoft's DirectX API. Furthermore, operations that are common to decompress different DXTC formats may be performed using multipurpose hardware.

Figure 2A:
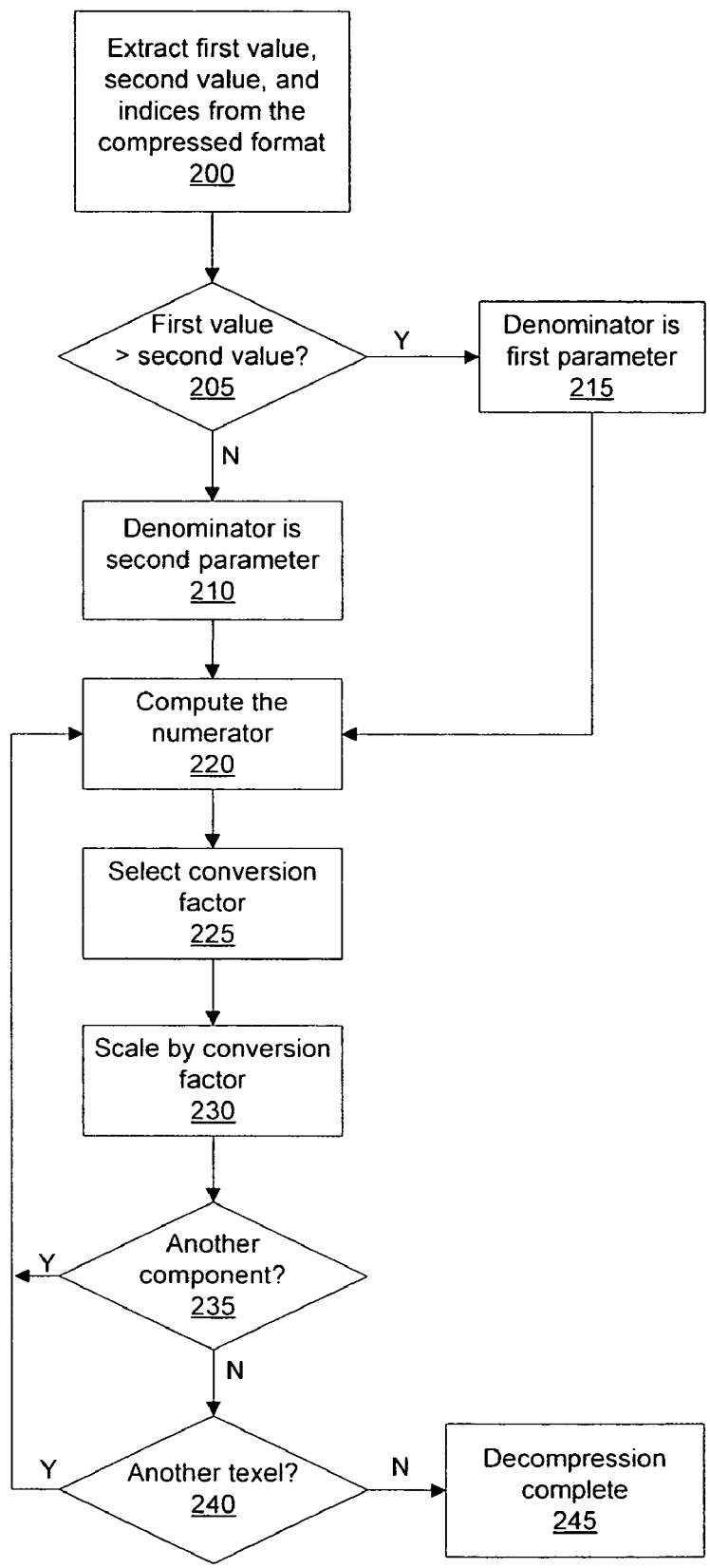
FIGS. 2A and 2B illustrate flow diagrams of exemplary methods of decompressing data represented in a conventional block compression format in accordance with one or more aspects of the present invention.

FIG. 2A illustrates a flow diagram of an exemplary method of decompressing texture data represented in a conventional block compression format in accordance with one or more aspects of the present invention. In step 200 a first value, a second value, and indices are extracted from the compressed format. When the DXT1 format is used the first value and the second value are each a 565 RGB color and the indices are each 2 bits. When the DXT2 format is used the first value, second value, and indices are the same as for DXT1 and a 4 bit alpha is included for each texel. For the purposes of the present invention, the DXT5 format is processed in the same manner as the DXT2 format. When the DXT5 format is used the first value, second value, and indices are the same as for DXT1, two alpha values, alpha0 and alpha1, and 16 3 bit alpha indices are also included. When the DXT5 format is used, the first value and the second values may each correspond to a 565 RGB or an alpha (alpha0 or alpha1). Likewise, the indices may correspond to the 2 bits color indices or the 3 bit alpha indices. A specific method for decompressing DXT5 format texture data is described in conjunction with FIG. 2B. For the purposes of the present invention, the BC4 format is processed in the same manner as the BC5 format.

When the BC4 or BC5 format is used the first value and the second value are each an unsigned or signed 8 bit component (red or green component) and the indices are 3 bits for each texel. A specific method for decompressing BC4 or BC5 format texture data is described in conjunction with FIG. 4.

In step 205 the first value is compared with the second value to determine if the compressed format is purely interpolated color block or if one or more indices indicate a fixed value. For example, DXT1, DXT2, DXT3, DXT4, and DXT5 formats may represent 4 unique interpolated values for each color component. Alternatively, DXT1 may represent 3 unique interpolated color values and 1 fixed value (transparent black). DXT4 and DXT5 formats always represent 8 unique interpolated values for alpha. The BC4 and BC5 formats may represent 8 unique interpolated values for each component or 6 unique interpolated values and 2 fixed values.

If, in step 205 the first value (color0) is greater than the second value (color1), then in step 215 a denominator is set to a first parameter, 3 in the case of DXT1. If, in step 205 the first value is not greater than the second value, then in step 210 the denominator is set to a second parameter, 2 in the case of DXT1. DXT2, DXT3, DXT4, and DXT5 always use a denominator of 3. For BC4 and BC5 the first parameter is 7 and the second parameter is 5. When DXT4 or DXT5 format alpha is decompressed the first parameter is 7 and the second parameter is 5.

In step 220 a numerator for a specific texel component (R, G, B, or alpha) is computed based on the first value, the second value, and the index corresponding to the texel. For example, for DXT1, DXT2, DXT3, DXT4, and DXT5 the red and blue component numerators are computed as:

Numerator$_c$=color0$_c$*(denominator−index)+ color1$_c$*index.

Numerator$_c$ is the component numerator value for the texel and index is the interpolation index corresponding to the texel. Color0$_c$ and color1$_c$ are the component values for Color0 and Color1. Because the red and blue components are each 5 bits for DXT1, DXT2, DXT3, DXT4, and DXT5 formats and the index is a 3 bit value, Numerator$_c$ is computed as a 7 bit value. A method for computing the green component numerator for DXT1, DXT2, DXT3, DXT4, and DXT5, the alpha component numerator for DXT5, and all of the component numerators for BC4 and BC5 is described in conjunction with FIG. 4. In some embodiments of the present invention, Numerator$_c$ is computed using color0$_c$ and color1$_c$ with more than 5 bits, and therefore Numerator$_c$ has more than 7 bits.

In step 225 a conversion factor is selected based on the denominator, the compression format, and the component (red, green, blue, or alpha). For example, for red and blue DXT1, DXT2, DXT3, DXT4, and DXT5 format components the conversion factor is 33 when the denominator is 2 and 22 when the denominator is 3. 33 is used to convert the 7 bit numerator into an 8 bit component and divide by the denominator, i.e., 33/8=255/(31*2). In some embodiments of the present invention, the conversion factor of 255/(31* 2)~4.113 is approximated by 33/8=4.125. Likewise, 22 is used to convert the 5 bit numerator into an 8 bit component and divide by the denominator, i.e., 22/8=255/(31*3). When the numerator of 6 bits is converted into an 8 bit value, the conversion factor is 1.35, i.e, 255/(63*3), for a denominator of 3 and 2, i.e, 255/(63*2), for a denominator of 2.

In step 230 a component for a texel, $Texel_c$, is computed by scaling the numerator by a conversion factor. For example, for DXT1, DXT2, DXT3, DXT4, and DXT5 the red and blue components are computed as:

$$Texel_c = Numerator_c * conversion\ factor.$$

$Texel_c$ is the component value for the texel and the conversion factor is selected based on the denominator, the compression format, and the component. In other embodiments of the present invention, step 230 may include other operations to produce the uncompressed texture data. Another method for computing the texel components for DXT1, DXT2, DXT3, DXT4, DXT5, BC4, and BC5 is described in conjunction with FIG. 4.

Figure 2B:
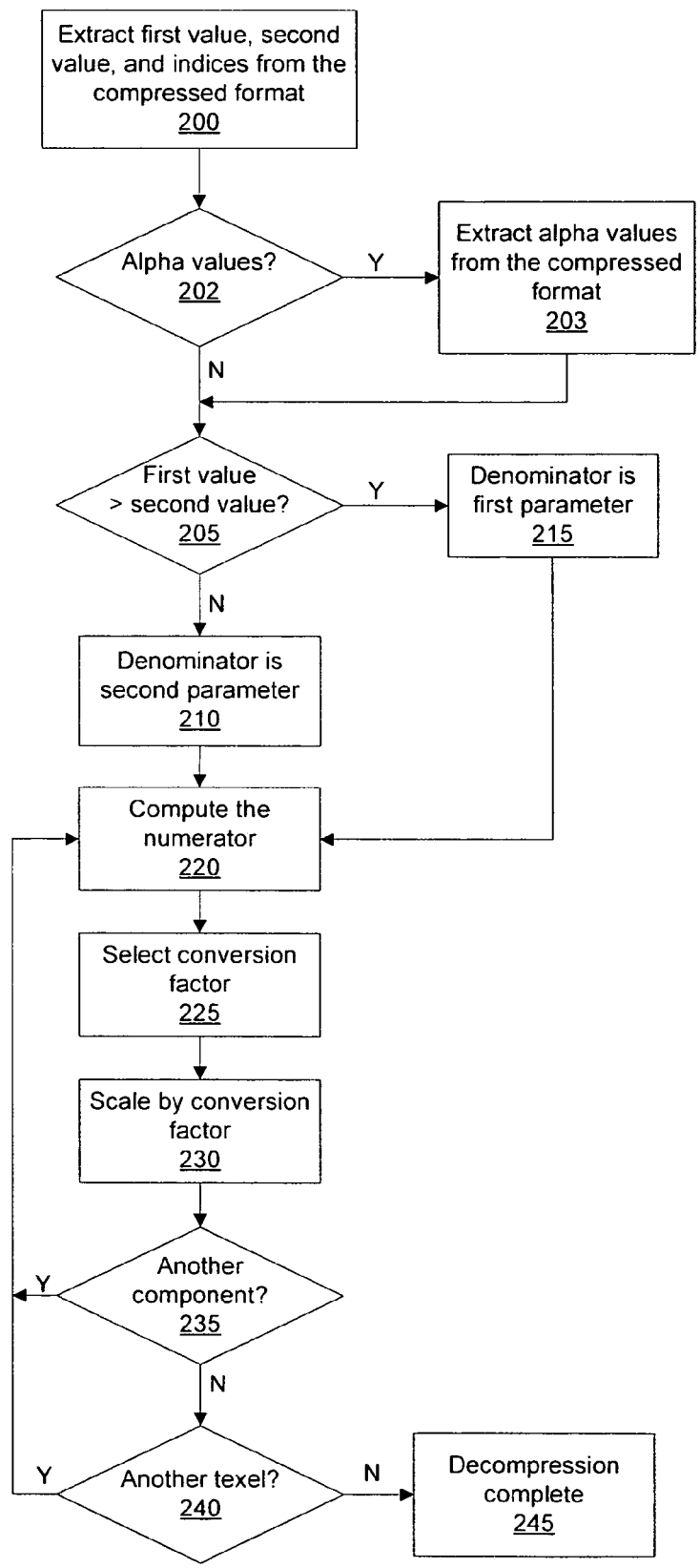

FIG. 2B illustrates a flow diagram of an exemplary method of decompressing texture data, including alpha, represented in a conventional block compression format in accordance with one or more aspects of the present invention. Step 200 is performed as described in conjunction with FIG. 2A. In step 202 the method determines if the compressed format includes two alpha values in addition to two color values, i.e. is the DXT4 or DXT5 format. If the DXT4 or DXT5 format is used, then in step 203, alpha0 and alpha1 are extracted and a denominator of 5 or 7 is used for alpha. Otherwise, the method proceeds to step 205. Steps 205, 210, 215, 220, 225, 230, 235, 240, and 245 are performed as described in conjunction with FIG. 2A. Persons skilled in the art will appreciate that any system configured to perform the method steps of FIG. 2A or 2B, or their equivalent, is within the scope of the present invention.

Figure 3:
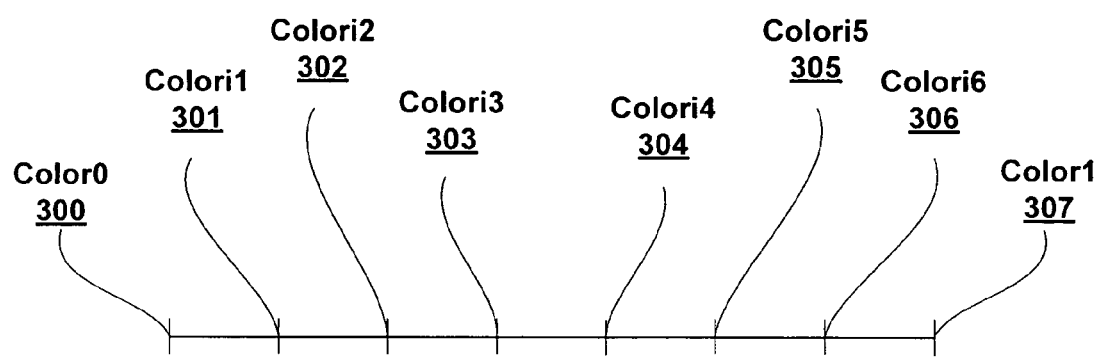
FIG. 3 is a conceptual diagram illustrating various interpolated texture components in accordance with one or more aspects of the present invention.

FIG. 3 is a conceptual diagram illustrating various interpolated texture components in accordance with one or more aspects of the present invention. Color0 300 and Color1 307 are extracted in step 200 of FIGS. 2A and 2B. Alpha0 and Alpha1 may be substituted for Color0 300 and Color1 307 to compute alpha values of decompressed texture data. An index value of 0, 1, 2, 3, 4, 5, 6, and 7 corresponds to color0 300, colori1 301, colori2 302, colori3 303, colori4 304, colori5 305, colori6 306, and color1 307, respectively. A step value may be computed as the difference between color1 307 and color0 300 for each component divided by the number of steps, 7. Each color component of colori1 301, colori2 302, colori3 303, colori4 304, colori5 305, and colori6 306 may then be computed as the sum of color0 300 and the product of the index and the step. This is a conventional method of computing interpolated values.

Computing the product of the step and index requires multiplying the step by a 3 bit index. The computation may be simplified and replaced with a shift operation if the step is limited to power of two values, e.g., 0, 1, 2, 4, 8, or the like. Instead of summing with color0 300 to compute each color component of colori1 301, colori2 302, colori3 303, colori4 304, colori5 305, and colori6 306, either color0 300 or color1 307 may be used. For example, colori1 301, colori2 302, and colori4 304 are computed as color0 300+ index*step and color3 303, color5 305, and color6 306 are computed as color1 307−(7-index)*step. When this technique is used, step is only scaled by a value that is a power of two and the computation is simplified to a shift operation followed by a sum computation.

Figure 4:
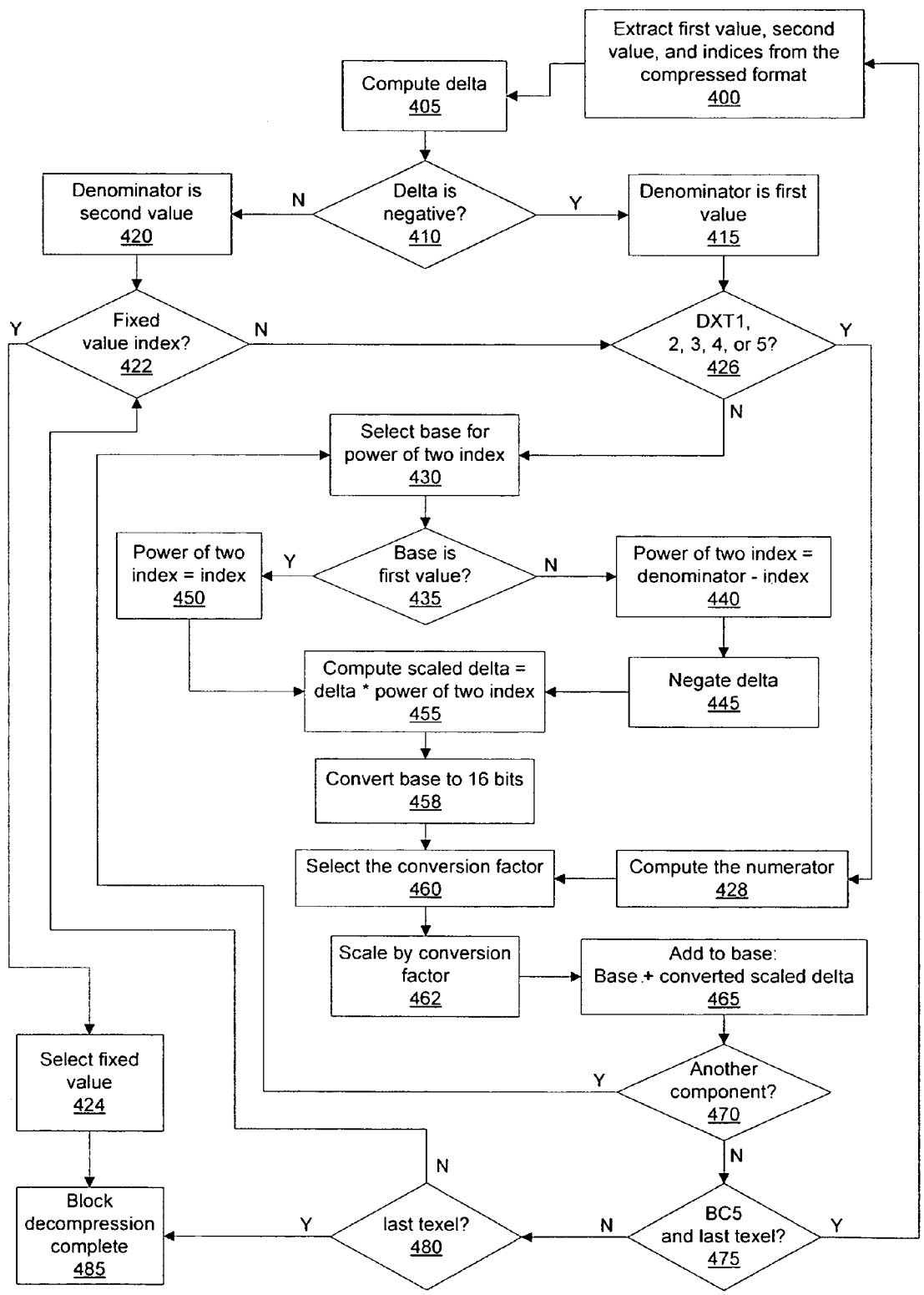
FIG. 4 illustrates a flow diagram of another exemplary method of decompressing data represented in a conventional block compression format in accordance with one or more aspects of the present invention.

The method of decompressing texture data that is shown in FIG. 4 computes interpolated values using the techniques described in conjunction with FIG. 3. FIG. 4 illustrates a flow diagram of another exemplary method of decompressing data represented in a conventional block compression format in accordance with one or more aspects of the present invention.

In step 400 a first texel value, a second texel value, and indices are extracted from the compressed format. The first texel value and the second texel value may be texel colors, e.g., 16 bit RGB or texel components, e.g., alpha, red, green, or blue. When the DXT4 and DXT5 formats are used two texel values, alpha0 and alpha1, and 16 3 bit alpha indices are also extracted. When the DXT1, DXT2, DXT3, DXT4, and DXT5 formats are used the first texel value and the second texel value are each a 565 RGB color and the indices are each 2 bits. When the BC4 format is used the first texel value and the second texel value are each an 8 bit red component. When the BC5 format is used the first texel value and the second texel value are either an 8 bit red component or an 8 bit green component.

In step 405 an 8 bit signed delta is computed as the difference between a component of the second texel value and a component of the first texel value when operating on DXT4, DXT5 alpha or in BC4 or BC5. While operating on the DXT1, DXT2, DXT3, DXT4, are DXT5 formats, we compute a 17 bit signed delta as the difference between the second texel value and the first texel value. When the BC4 format is used, in some embodiments of the present invention, prior to computing the difference, the sign bit of the component of the first texel value and the component of the second texel value are inverted and the component of the first texel value and the component of the second texel value are mapped to −127 when those values are equal to −128.

In step 410 the method determines if delta is negative, i.e. if the first texel value is greater than the second value, and, if so, in step 415 a denominator is set to a first parameter, 3 in the case of DXT1, DXT2, DXT3, DXT4, and DXT5. If, in step 410 the delta is not negative, then in step 420 the denominator is set to a second parameter, 2 in the case of DXT1, 3 in the case of DXT2, DXT3, DXT4, and DXT5. For BC4 and BC5 the first parameter is 7 and the second parameter is 5. When DXT4 and DXT5 format alpha is decompressed the first parameter is 7 and the second parameter is 5. When a denominator of 3 or 5 is used, index values 3 and 6 and 7, respectively, are used to specify fixed component values, e.g., 0, 1, −1, or the like.

In step 422, the method determines if a fixed value should be output for the decompressed texture data, and, if not, the method proceeds to step 426. Fixed values may be specified for the DXT1, DXT4, DXT5, BC4, and BC5 formats. If, in step 422 the method determines that a fixed value should be output, then in step 424 the texture data is set to a fixed value. For example, when the DXT1 format is used, and color0 is less than or equal to color1, and the index is 3 the texture data is set to 0. When the BC4 or BC5 signed format is used and the index is 6 the texture data is set to −1 and when the index is 7 the texture data is set to +1. When the BC4 or BC5 unsigned format is used or when the DXT4 or DXT5 format is used for alpha, and component 0 is less than or equal to component 1, the texture data is set to 0 when the index is 6 and the texture data is set to 1 when the index is 7.

In step 426, the method determines if red and blue DXT1, DXT2, DXT3, DXT4, and DXT5 format components are being decompressed, and, if so, the method proceeds to step

428. In step 428 the red and blue component numerators for DXT1, DXT2, DXT3, DXT4, and DXT5 are computed as:

Numerator$_c$=first value$_c$*(denominator−index)+second value$_c$*index.

Numerator$_c$ is the component numerator value for the texel and index is the index corresponding to the texel. First value$_c$ and second value$_c$ are the component values for the first texel value and the second texel value. Because the red and blue components are each 5 bits and the index is 3 bits, Numerator$_c$ is computed as a 7 bit value. A base is set to zero and the method then proceeds to step 460.

If, in step 426, the method determines that the red and blue DXT1, DXT2, DXT3, DXT4, and DXT5 format components are not being decompressed, then the method proceeds to step 430. In step 430 a base is selected for a power of two index. Specifically, when the format is BC4 or BC5, a component of the first texel value is selected as the base when the index is 0 or 1, or when the index is 2 and the denominator is 5 or 7, or when the index is 4 and the denominator is 7. Otherwise, in step 430 a component of the second texel value is selected as the base. When the format is a green component in DXT1, DXT2, DXT3, DXT4, or DXT5, the green component of the first texel value is selected as the base when the index is 0 or 1 and the green component of the second texel value is selected as the base when the index is 2 or 3. In step 435, the method determines if a component of the first texel value was selected as the base, and, if so, in step 450 the power of two index is equal to the index (0, 1, 2, or 4).

If, in step 435, the method determined that a component of the second texel value was selected as the base, then in step 440 the power of two index is computed as the difference between the denominator and the index. In step 445 the delta is negated since a component of the second texel value is selected as the base.

In some embodiments of the present invention, when the DXT1, DXT2, DXT3, DXT4, and DXT5 formats are used the power of two index is scaled by 2 in step 440 or step 450 for the green component and the conversion factor is doubled for that component. As explained in conjunction with step 460 doubling the conversion factor for the DXT5 format reduces the range of the conversion factors, further simplifying the computation to produce the decompressed texture data.

In step 455 the method computes a scaled delta, i.e., numerator, for each component of the texel as delta for each respective component scaled by the power of two index. Because the power of two index is a power of two, scaled deltas are computed using a shift operation rather than a more complex multiplication operation. In hardware a shift operation may be performed using a multiplexer rather than adders, therefore fewer transistors are used to perform a shift operation. The scaled delta is 11 bits for all of the components except for the green component which is 10 bits. The green component is smaller and the index for green is 0 or 2 since the power of two index for the green component is doubled.

Figure 5:
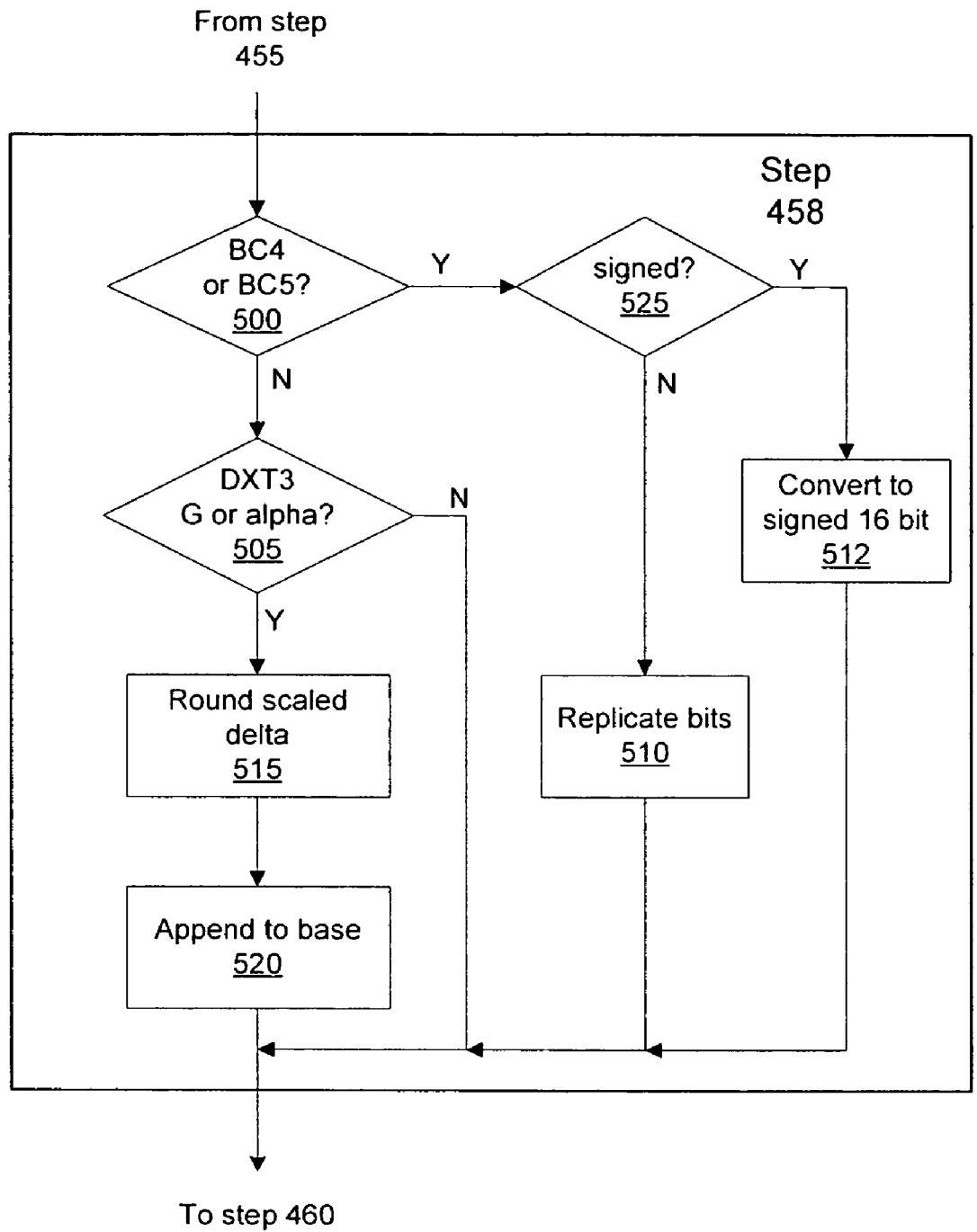
FIG. 5 illustrates flow diagram of an exemplary method of performing a step shown in FIG. 4 in accordance with one or more aspects of the present invention.

In step 458 the 8 bit component bases may be converted into 16 bit bases, in an 8.8 fixed point representation. In some embodiments of the present invention, the 8 bits of each component base are replicated to produce the 8 fractional bits of each 16 bit component base. In other embodiments of the present invention, the method described in conjunction with FIG. 5 is used to produce the 16 bit base.

In step 460 a conversion factor is selected based on the denominator, the compression format, and the component (red, green, blue, or alpha). For example, as previously described in conjunction with FIG. 2A, when the red and blue DXT1, DXT2, DXT3, DXT4, and DXT5 format components are decompressed the conversion factor is 33 when the denominator is 2 and 22 when the denominator is 3. 33 is used to convert the 5 bit numerator into an 8 bit component and divide by the denominator, i.e., 33/8=255/(31*2). Likewise, 22 is used to convert the 5 bit numerator into an 8 bit component and divide by the denominator, i.e., 22/8=255/(31*3). When the green DXT1, DXT2, DXT3, DXT4, and DXT5 format component is decompressed, the conversion factor is 64 when the denominator is 2 and 40 when the denominator is 3. 40 is used to convert the 8 bit numerator (produced by replicating the 2 msbs of the 6 bit green component and appending the 2 replicated bits to the 6 bit green component) into a 16 bit component and divide by twice the denominator, i.e. 40~65535/(255*6)=42.667. Likewise, 64 is used to convert the 8 bit numerator into a 16 bit component and divide by twice the denominator, i.e. 64=65535/(255*4). Note that 40 is a poor approximation of 42.667. Therefore, in step 458 the base is modified, resulting in a conversion factor of 40.25 which is a closer approximation to 42.667. In some embodiments of the present invention, the base is also modified when the conversion factor is 64, resulting in a conversion factor of 64.25 instead of 64. Although 64.25 is not as accurate, the decompressed component produced using the conversion factor of 64.25 is within the error specified by the DXT1, DXT2, DXT3, DXT4, and DXT5 standards.

When the alpha DXT4 or DXT5 format component or any BC4 or BC5 component is decompressed, the conversion factor is 36 when the denominator is 7 and 48 when the denominator is 5. 36 is used to convert the 8 bit numerator into a 16 bit component and divide by the denominator, i.e., 36~65535/(255*7). Likewise, 48 is used to convert the 8 bit numerator into a 16 bit component and divide by the denominator, i.e. 48~65535/(255*5).

In step 462 a converted scaled delta is produced by multiplying the scaled delta computed in step 455, i.e., numerator, by the conversion factor selected in step 458. When the conversion factors of 36, 40, 48, and 64 are selected, the scaling is performed by summing the numerator shifted by 5 with the numerator shifted by 2, 3, 4, or 5, respectively. The conversion factors are each broken down into a sum of two powers of two, e.g., 36=32+4, 40=32+8, 48=32+16, and 64=32+32, permitting the simplification of the scaling to the sum of shifted values, thereby reducing the number of transistors needed to implement the function in hardware.

In step 465 the base for each component of the texel is summed with the converted scaled delta to produce the decompressed component value for the texel. 8 bit values are produced for the decompressed components in DXT1, DXT2, DXT3, DXT4, and DXT5 formats. 16 bit values are produced for the decompressed components in BC4 and BC5 formats. In step 470 the method determines if another component should be decompressed for the DXT1, DXT2, DXT3, DXT4, and DXT5 formats since the red and blue components are decompressed differently than the green and alpha components. If, in step 470, the method determines that another component should be decompressed for the DXT1, DXT2, DXT3, DXT4, and DXT5 formats, then the method returns to step 430 to produce the other compressed components. Otherwise, the method proceeds to step 475 and determines if the format is BC5 and the last index, corresponding to the last texel encoded in the block, for a red component was used to produce a decompressed value.

If, in step 475 the red component for the last texel of a BC5 format block was produced, then the method returns to step 400 to produce the decompressed green components for the BC5 format block. Otherwise, the method proceeds to step 480 to determine if the last texel was produced, and, if so, in step 485 decompression of the block is complete. If, in step 480, the method determines that the last texel was not produced in step 465, then the method returns to step 422 to produce another texel using another index.

FIG. 5 illustrates flow diagram of an exemplary method of performing step 458 shown in FIG. 4 in accordance with one or more aspects of the present invention. In step 500 the method determines if the format is BC4 or BC5, and, if so, the method proceeds to step 525. In step 525 the method determines if the BC4 or BC5 format is signed, and, if so, the method proceeds to step 512. Otherwise the method proceeds to step 510. In step 510 the unsigned 8 bits of the base are replicated to produce an unsigned 8.8 format 16 bit base and the method proceeds to step 460. In step 512 the signed 8 bit base is converted into a signed 16 bit base and the method proceeds to step 460. Specifically, signed 8 bit values between −127 and +127 (inclusive) are converted into signed values between −32767 and +32767 (inclusive).

If, in step 500 the method determines that the format is not BC4 or BC5, then in step 505 the method determines if the component to be decompressed is the green or alpha component in DXT4 or DXT5 format. If, in step 505, the method determines that the component to be decompressed is not the green or alpha component in DXT5 format, then the method proceeds to step 460.

If, in step 505, the method determines that the component to be decompressed is the green or alpha component in DXT4 or DXT5 format, then in step 520 the scaled delta computed in step 455 is rounded. The low 2 or 3 bits of the scaled delta (the scaled delta is 10 bits for the green component and 11 bits for the other components) are discarded to produce an 8 bit value and the sign bit is inverted. Inverting the sign bit produces a rounded scaled delta equal to the 8 bit scaled delta+128. In step 520 the rounded scaled delta is appended to the base to produce an 8.8 format base value where the 8 bit base is the integer portion and the rounded scaled delta, also 8 bits, is the fractional portion. The method then proceeds to step 460. Increasing the base by the rounded scaled delta produces a more accurate decompressed value for the green and alpha components of the DXT4 or DXT5 format because the conversion factor of 40 is too low. Increasing the base for the green component is similar to using a conversion factor of 40.25 and produces a result for the green component that is within the error specified by the DXT5 standard.

The decompression computations may be simplified by combining denominators for linear interpolation with format conversion to produce fixed conversion factors for each compression format. Power of two indices are used to simplify multiplication operations for computing numerators. Conversion factors are used that simplify multiplication operations by using a shift operation. Simplifying the computations so that they require fewer transistors reduces die area while maintaining the required accuracy and maintaining the same throughput for texture data decompression. Reducing the die area permits more texture data to be decompressed in the same die area compared with a more accurate decompression, thereby increasing texture decompression throughput. Persons skilled in the art will appreciate that any system configured to perform the method steps of FIG. 4 or 5, or their equivalents, is within the scope of the present invention.

Figure 6:
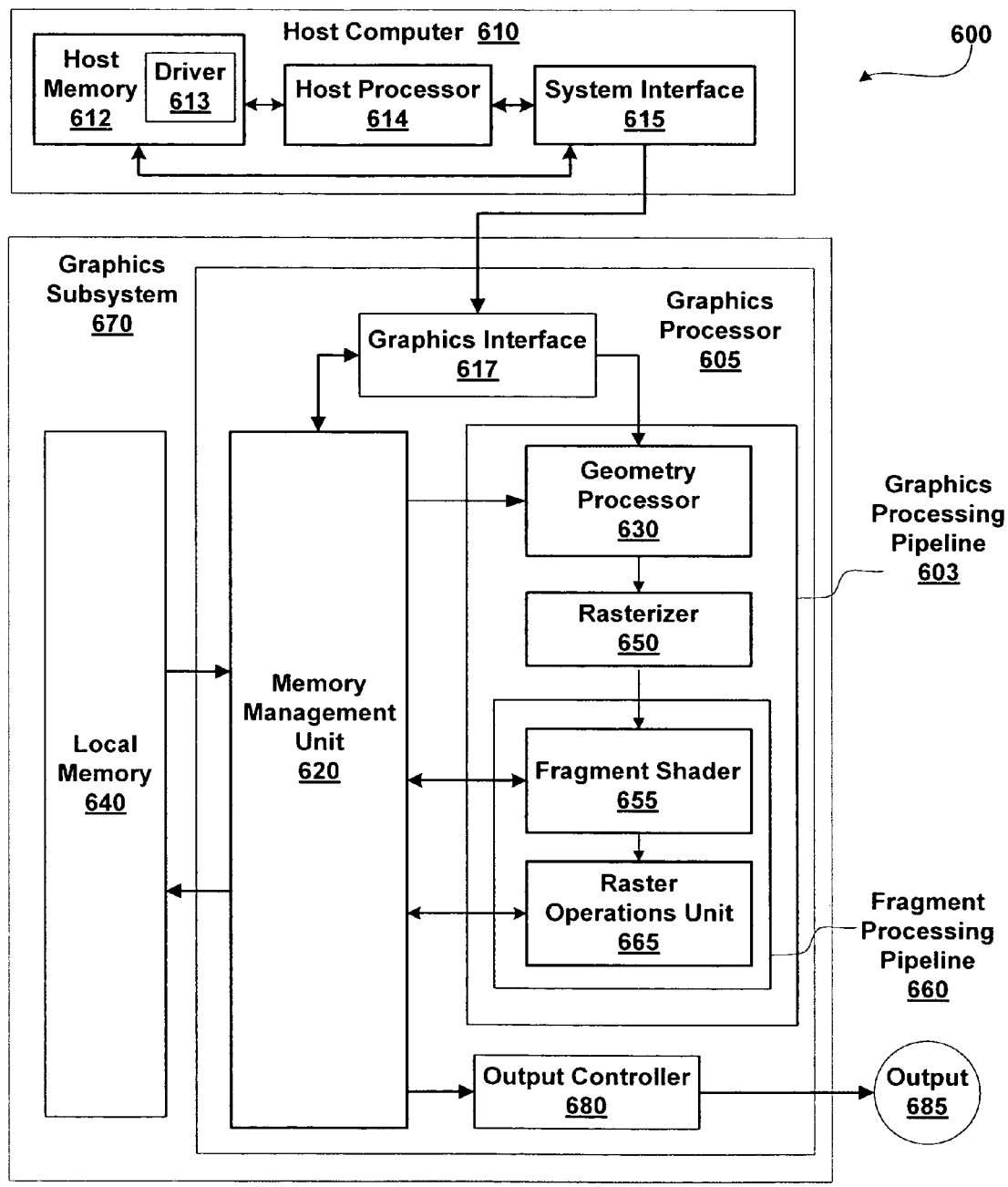
FIG. 6 is a block diagram of a graphics processing system in accordance with one or more aspects of the present invention.

FIG. 6 is a block diagram of an exemplary embodiment of a respective computer system, generally designated 600, and including a host computer 610 and a graphics subsystem 607 in accordance with one or more aspects of the present invention. Computing system 600 may be a desktop computer, server, laptop computer, palm-sized computer, tablet computer, game console, portable wireless terminal such as a PDA or cellular telephone, computer based simulator, or the like. Host computer 610 includes host processor 614 that may include a system memory controller to interface directly to host memory 612 or may communicate with host memory 612 through a system interface 615. System interface 615 may be an I/O (input/output) interface or a bridge device including the system memory controller to interface directly to host memory 612. An example of system interface 615 known in the art includes Intel® Northbridge.

A graphics device driver, driver 613, interfaces between processes executed by host processor 614, such as application programs, and a programmable graphics processor 605, translating program instructions as needed for execution by programmable graphics processor 605. Driver 613 also uses commands to configure sub-units within programmable graphics processor 605. Specifically, driver 613 may specify the compression format, e.g., DXT1, DXT2, DXT3, DXT4, DXT5, BC4, or BC5, used to compress texture data for one or more texture maps.

Graphics subsystem 607 includes a local memory 640 and programmable graphics processor 605. Host computer 610 communicates with graphics subsystem 670 via system interface 615 and a graphics interface 617 within programmable graphics processor 605. Data, program instructions, and commands received at graphics interface 617 can be passed to a graphics processing pipeline 603 or written to a local memory 640 through memory management unit 620. Programmable graphics processor 605 uses memory to store graphics data, including texture maps, and program instructions, where graphics data is any data that is input to or output from computation units within programmable graphics processor 605. Graphics memory is any memory used to store graphics data or program instructions to be executed by programmable graphics processor 605. Graphics memory can include portions of host memory 612, local memory 640 directly coupled to programmable graphics processor 605, storage resources coupled to the computation units within programmable graphics processor 605, and the like. Storage resources can include register files, caches, FIFOs (first in first out memories), and the like.

In addition to Interface 617, programmable graphics processor 605 includes a graphics processing pipeline 603, a memory controller 620 and an output controller 680. Data and program instructions received at interface 617 can be passed to a geometry processor 630 within graphics processing pipeline 603 or written to local memory 640 through memory controller 620. In addition to communicating with local memory 640, and interface 617, memory controller 620 also communicates with graphics processing pipeline 603 and output controller 680 through read and write interfaces in graphics processing pipeline 603 and a read interface in output controller 680.

Within graphics processing pipeline 603, geometry processor 630 and a programmable graphics fragment processing pipeline, fragment processing pipeline 660, perform a variety of computational functions. Some of these functions are table lookup, scalar and vector addition, multiplication, division, coordinate-system mapping, calculation of vector normals, tessellation, calculation of derivatives, interpolation, filtering, and the like. Geometry processor 630 and fragment processing pipeline 660 are optionally configured such that data processing operations are performed in multiple passes through graphics processing pipeline 603 or in multiple passes through fragment processing pipeline 660. Each pass through programmable graphics processor 605, graphics processing pipeline 603 or fragment processing pipeline 660 concludes with optional processing by a raster operations unit 665.

Vertex programs are sequences of vertex program instructions compiled by host processor 614 for execution within geometry processor 630 and rasterizer 650. Shader programs are sequences of shader program instructions compiled by host processor 614 for execution within fragment processing pipeline 660. Geometry processor 630 receives a stream of program instructions (vertex program instructions and shader program instructions) and data from interface 617 or memory controller 620, and performs vector floating-point operations or other processing operations using the data. The program instructions configure subunits within geometry processor 630, rasterizer 650 and fragment processing pipeline 660. The program instructions and data are stored in graphics memory, e.g., portions of host memory 612, local memory 640, or storage resources within programmable graphics processor 605. When a portion of host memory 612 is used to store program instructions and data the portion of host memory 612 can be uncached so as to increase performance of access by programmable graphics processor 605. Alternatively, configuration information is written to registers within geometry processor 630, rasterizer 650 and fragment processing pipeline 660 using program instructions, encoded with the data, or the like.

Data processed by geometry processor 630 and program instructions are passed from geometry processor 630 to a rasterizer 650. Rasterizer 650 is a sampling unit that processes primitives and generates sub-primitive data, such as fragment data, including parameters associated with fragments (texture identifiers, texture compression formats, texture coordinates, and the like). Rasterizer 650 converts the primitives into sub-primitive data by performing scan conversion on the data processed by geometry processor 630. Rasterizer 650 outputs fragment data and shader program instructions to fragment processing pipeline 660.

The shader programs configure the fragment processing pipeline 660 to process fragment data by specifying computations and computation precision. Fragment shader 655 is optionally configured by shader program instructions such that fragment data processing operations are performed in multiple passes within fragment shader 655. Fragment shader 655 may include one or more texture data decompression units. Decompressed texture map data may be applied to the fragment data using techniques known to those skilled in the art to produce shaded fragment data.

Fragment shader 655 outputs the shaded fragment data, e.g., color and depth, and codewords generated from shader program instructions to raster operations unit 665. Raster operations unit 665 includes a read interface and a write interface to memory controller 620 through which raster operations unit 665 accesses data stored in local memory 640 or host memory 612. Raster operations unit 665 may perform near and far plane clipping and raster operations, such as stencil, z test, blending, and the like, using the fragment data and pixel data stored in local memory 640 or host memory 612 at a pixel position (image location specified by x,y coordinates) associated with the processed fragment data. The output data from raster operations unit 665 is written back to local memory 640 or host memory 612 at the pixel position associated with the output data and the results, e.g., image data are saved in graphics memory.

When processing is completed, an output 685 of graphics subsystem 607 is provided using output controller 680. Alternatively, host processor 614 reads the image stored in local memory 640 through memory controller 620, interface 617 and system interface 615. Output controller 680 is optionally configured by opcodes to deliver data to a display device, network, electronic control system, other computing system 600, other graphics subsystem 607, or the like.

Figure 7A:
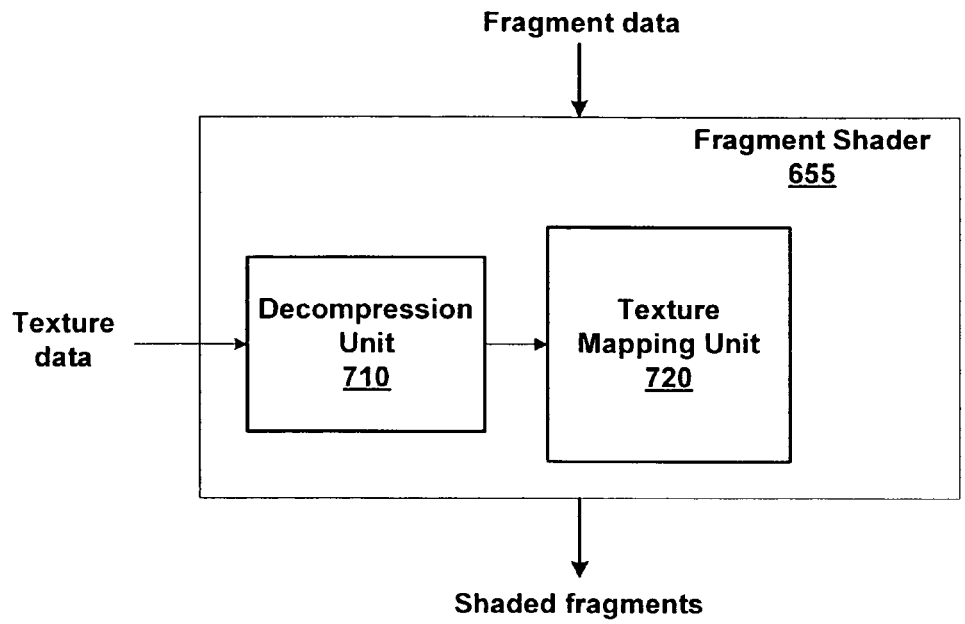
FIG. 7A is an exemplary block diagram of the fragment shader of FIG. 6 in accordance with one or more aspects of the present invention.

FIG. 7A is an exemplary block diagram of fragment shader 655 of FIG. 6 in accordance with one or more aspects of the present invention. Fragment shader 655 receives fragment data, including parameters associated with fragments (texture identifiers, texture coordinates, and the like). The texture identifiers may specify the compression format. Fragment shader 655 generates read requests for texture data that may stored as compressed texture data represented in a block compression format, such as DXT1, DXT2, DXT3, DXT4, DXT5, BC4, or BC5.

In some embodiments of the present invention, fragment shader 655 or decompression unit 710 may include one or more cache memories configured to store texture data. A first cache memory may store compressed texture data and a second cache memory may store decompressed texture data. Decompression unit 710 receives the compressed texture data and decompresses it to produce texture data including one or more components. A texture mapping unit 720 receives the texture data and processes the fragment data using the texture data to produce textured fragment data. Other processing units (not shown) may process the texture fragment data using techniques known to those skilled in the art to produce shaded fragments.

Figure 7B:
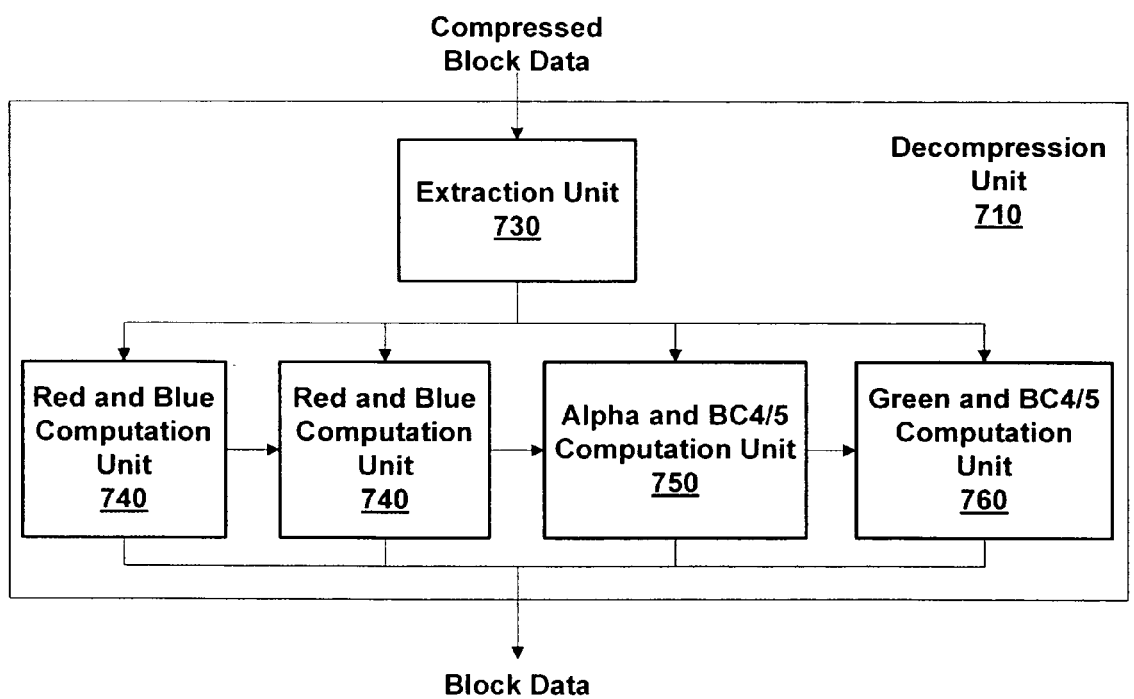
FIG. 7B is an exemplary block diagram of the decompression unit of FIG. 7A in accordance with one or more aspects of the present invention.

FIG. 7B is an exemplary block diagram of decompression unit 710 of FIG. 7A in accordance with one or more aspects of the present invention. An extraction unit 730 within decompression unit 710 receives compressed block data and extracts the first and second values and indices, from the compressed block data. Extraction unit 730 outputs the first and second texel values and indices to two red and blue computation units 740, an alpha and BC4/5 computation unit 750, and a green and BC4/5 computation unit 760. Extraction unit 730 may be configured to perform step 200 of FIG. 2A, steps 200, 202, and 203 of FIG. 2B, and step 400 of FIG. 4. Each computation unit, e.g., red and blue computation unit 740, alpha and BC4/5 computation unit 750, and green and BC4/5 computation unit 760, is configured to decompress texture data for more than one DXTC format. Depending on the DXTC format that is used for a block, as many as four of the computation units are used to produce the decompressed texture data. This is more efficient in terms of transistor utilization compared with an embodiment that uses a dedicated computation unit for each DXTC compression format.

Red and blue computation units 740 decompress the compressed red and blue components for DXT1, DXT2, DXT3, DXT4, and DXT5 formats. Each red and blue computation unit 740 may be configured to produce either a blue or red component. Each read and blue computation unit 740 receives two 5 bit components (extracted from two 16 bit, 565 RGB, values) and 16 2 bit indices, and produces an 8 bit red or blue component when the compressed texture data is in the DXT1, DXT2, DXT3, DXT4, or DXT5 format. Red and blue computation unit 740 may be configured to perform steps 205, 210, 215, 220, 225, 230, 235, 240, and 245 of FIGS. 2A and 2B. Red and blue computation unit 740 may be configured to perform steps 405, 410, 415, 420, 422,

424, 426, 428, 460, 462, 465, 470, 480, and 485 of FIG. 4. In some embodiments of the present invention, red and blue computation unit 740 receives the 16 bit 565 RGB values and includes a 16 bit comparator to perform step 205 or steps 410 and 415, two 6 bit adders to perform step 220 or 428, and two 7 bit by 6 bit multipliers to perform step 230 or 462.

Alpha and BC4/5 computation unit 750 decompresses the compressed alpha component in DXT4 or DXT5 format and a compressed component in signed or unsigned BC4 or BC5 format, receiving two 8 bit texel values (alpha or other components) and 16 3 bit indices. Alpha and BC4/5 computation unit 750 produces an 8 bit alpha component when the compressed texture data is in the DXT4 or DXT5 format. Alpha and BC4/5 computation unit 750 produces a 16 bit component when the compressed texture data is in the BC4 or BC5 format. Alpha and BC4/5 computation unit 750 may be configured to perform steps 205, 210, 215, 220, 225, 230, 235, 240, and 245 of FIGS. 2A and 2B. Alpha and BC4/5 computation unit 750 may be configured to perform steps 405, 410, 415, 420, 422, 424, 430, 435, 440, 445, 450, 455, 458, 460, 462, 465, 470, 475, 480, and 485 of FIG. 4. In some embodiments of the present invention, alpha and BC4/5 computation unit 750 includes an 8 bit subtractor to perform step 205 or step 410, one 9 bit incrementor to perform step 458, and one 14 bit three input adder to perform step 230 or steps 462 and 465. Multiplexers are used to perform shift operations for steps 455, 462, and 465 of FIG. 4.

Green and BC4/5 computation unit 760 decompresses the compressed green component in DXT1, DXT2, DXT3, DXT4, or DXT5 format and the compressed signed or unsigned component in BC4 or BC5 format. Green and BC4/5 computation unit 760 receives two 6 or 8 bit values (green or other components, respectively) and 16 3 bit indices. Green and BC4/5 computation unit 760 produces an 8 bit green component when the compressed texture data is in the DXT1, DXT2, DXT3, DXT4, or DXT5 format. Green and BC4/5 computation unit 760 produces a 16 bit component when the compressed texture data is in the BC4 or BC5 format. Green and BC4/5-computation unit 760 may be configured to perform steps 205, 210, 215, 220, 225, 230, 235, 240, and 245 of FIGS. 2A and 2B. Green and BC4/5 computation unit 760 may be configured to perform steps 405, 410, 415, 420, 422, 424, 430, 435, 440, 445, 450, 455, 458, 460, 462, 465, 470, 475, 480, and 485 of FIG. 4. In some embodiments of the present invention, green and BC4/5 computation unit 760 includes an 8 bit subtractor to perform step 205 or step 410, one 9 bit incrementor to perform step 458, and one 14 bit three input adder to perform step 230 or steps 462 and 465. Multiplexers are used to perform shift operations for steps 455, 462, and 465 of FIG. 4. In some embodiments of the present invention, a single computation unit may be configured to perform the combined functions of Green and BC4/5 computation unit 760 and Alpha and BC4/5 computation unit 750.

The computation used to perform decompression of texture data represented in block encoded DXTC formats may be simplified while still meeting the required accuracy for the decompressed component values. Specifically, interpolated values may be computed using only power of two indices. The bit precision format conversion, e.g., 5 bits to 8 bits, 8 bits to 16 bits, and the like, may be combined with the division for the specific formats. For example, conversion from 5 to 8 bits may be combined with division by either 3 or 2 for DXT1, DXT2, DXT3, DXT4, and DXT5 format blocks. Similarly, conversion from 8 to 16 bits may be combined with division by either 5 or 7 for BC4 and BC5 format blocks. Fixed conversion factors, based on the compression format, and comparison of the first value and the second value, and component, may be used to perform the conversion. Furthermore, these fixed conversion factors may be used to scale numerator values without requiring multiplication, further simplifying the computations. The simpler computations may be implemented with fewer transistors, resulting in a smaller die area for the same texture data decompression throughput or a greater texture data decompression throughput for the same die area compared with a more accurate computation. Multiple DXTC compressed texture formats may be decompressed using a multipurpose decompression unit to produce the texture data given a variety of formats rather than using dedicated decompression units that are specific to each DXTC format.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of decompressing texture data encoded in a block compression format, comprising:
    computing one common denominator for all texel components in an encoded compressed block of texture data based on a first texel value and a second texel value, wherein the first texel value includes at least a first texel component value and the second texel value includes at least a second texel component value;
    computing a numerator for a first texel component by scaling a difference between the first texel component value and the second texel component value by a power of two index that is based on an index, wherein:
        the power of two index is equal to the index when a base is computed from the first texel value, and
        the power of two index is equal to a difference between the one common denominator and the index when the base is computed from the second texel value;
    selecting a conversion factor from a fixed set of conversion factors based on the block compression format, the first texel component, and the one common denominator;
    scaling the numerator by the conversion factor to produce a decompressed value for the first texel component; and
    summing the scaled numerator with the base computed from the first texel value or from the second texel value to produce the decompressed value for the first texel component.

2. The method of claim 1, wherein the scaling is performed using one shift operation and one addition operation.

3. The method of claim 1, further comprising doubling the power of two index when the first texel component value is green.

4. The method of claim 1, further comprising converting the base from an 8 bit value to a 16 bit value by appending an 8 bit fraction that is computed based on the numerator.

5. The method of claim 4, wherein the 8 bit fraction is computed as a sum of 128 and the numerator divided by four.

6. The method of claim 1, further comprising converting the base from an 8 bit value to a 16 bit value by appending the 8 bit value to the base as a fractional portion.

7. The method of claim 1, wherein the fixed set of conversion factors includes 22, 33, 36, 40, 48, and 64.

8. A method of decompressing texture data encoded in a block compression format by computing an interpolated value given two texel component values and a block texture data compression format index, comprising:
   computing a difference between the two texel component values;
   determining one common denominator for all texel components in an encoded compressed block based on the computed difference between the two texel component values;
   selecting one of the two texel component values as a base texel component value based on the block texture data compression format index, wherein:
      a first of the two texel component values is selected as the base texel component value when the index is 0 or 1, or when the index is 2 and a denominator is 5 or 7, or when the index is 4 and the denominator is 7,
      a second of the two texel component values is selected as the base texel component value when the index is not 0 or 1, or when the index is not 2 and the denominator is 5 or 7, or when the index is 2 and the denominator is not 5 or 7, or when the index is not 4 and the denominator is 7, or when the index is 4 and the denominator is not 7, and
      wherein the denominator is the larger texel component value of the two texel component values;
   determining a power of two index based on the block texture data compression format index and the difference between the two texel component values;
   computing the interpolated value by combining the base texel component value with the difference between the two texel component values scaled by the power of two index; and
   producing a decompressed value using the computed interpolated value.

9. The method of claim 8, wherein the computing includes scaling the difference between the two texel component values scaled by the power of two index by a fixed conversion factor before combining with the base texel component value.

10. A method of decompressing texture data encoded in a block compression format, comprising:
   computing one common denominator for all texel components in an encoded compressed block of texture data based on a first texel value and a second texel value, wherein the first texel value includes at least a first texel component value and the second texel value includes at least a second texel component value;
   computing a numerator for a first texel component by summing a product of an index and the second texel component value with a product of the first texel component value and a difference between the one common denominator and the index;
   selecting a conversion factor from a fixed set of conversion factors based on the block compression format, the first texel component, and the one common denominator;
   scaling the numerator by the conversion factor to produce a decompressed value for the first texel component; and
   summing the scaled numerator with a base computed from the first texel value or from the second texel value to produce the decompressed value for the first texel component.

11. The method of claim 10, wherein the scaling is performed using one shift operation and one addition operation.

12. The method of claim 10, further comprising converting the base from an 8 bit value to a 16 bit value by appending an 8 bit fraction that is computed based on the numerator.

13. The method of claim 12, wherein the 8 bit fraction is computed as a sum of 128 and the numerator divided by four.

14. The method of claim 10, further comprising converting the base from an 8 bit value to a 16 bit value by appending the 8 bit value to the base as a fractional portion.

15. The method of claim 10, wherein the fixed set of conversion factors includes 22, 33, 36, 40, 48, and 64.

* * * * *